United States Patent
Nakasone (10) Patent No.: US 12,203,301 B2
(45) Date of Patent: Jan. 21, 2025

(54) LOCK LEVER AND OPENING/CLOSING DEVICE

(71) Applicant: PIOLAX, INC., Kanagawa (JP)

(72) Inventor: Hisashi Nakasone, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 269 days.

(21) Appl. No.: 17/772,034

(22) PCT Filed: Oct. 30, 2020

(86) PCT No.: PCT/JP2020/040796
§ 371 (c)(1),
(2) Date: Apr. 26, 2022

(87) PCT Pub. No.: WO2021/085595
PCT Pub. Date: May 6, 2021

(65) Prior Publication Data
US 2022/0396983 A1 Dec. 15, 2022

(30) Foreign Application Priority Data

Nov. 1, 2019 (JP) .................................. 2019-199714

(51) Int. Cl.
*E05C 3/14* (2006.01)
*B60R 7/04* (2006.01)
*E05B 83/32* (2014.01)

(52) U.S. Cl.
CPC ................. *E05C 3/14* (2013.01); *B60R 7/04* (2013.01); *E05B 83/32* (2013.01)

(58) Field of Classification Search
CPC . E05C 3/045; E05C 3/14; E05C 19/06; E05C 19/10; E05C 19/12; Y10S 292/11;
(Continued)

(56) References Cited

U.S. PATENT DOCUMENTS 308,880 A * 12/1884 Decker ............... E05B 65/0811
292/128
416,002 A * 11/1889 Langenau ........... E05B 65/0811
292/128
(Continued)

FOREIGN PATENT DOCUMENTS

CH           4346   * 12/1891
DE     3702118 A   *  8/1988 ............. E05B 83/24
(Continued)

OTHER PUBLICATIONS

CH4346 translation (Dec. 18, 1891).*
(Continued)

*Primary Examiner* — Carlos Lugo
(74) *Attorney, Agent, or Firm* — Paratus Law Group, PLLC (57) ABSTRACT

There is provided a lock lever including: a base portion having an operation portion; a rotation shaft portion that is pivotally supported by the lid body and that allows the base portion to rotate; a lock portion that is configured to rotate together with the base portion and that is configured to be locked to or unlocked from the fixed body in accordance with rotation; and an elastic piece that extends from the base portion and that has a tip end side configured to elastically contact the lid body to bias the lock portion in a direction to lock the lock portion. The elastic piece extends from the base portion so as to approach the rotation shaft portion, and extends so as to be separated from the rotation shaft portion toward a tip end on the way when viewed in a rotation axis direction.

6 Claims, 8 Drawing Sheets

(58) Field of Classification Search
CPC .............. Y10S 292/38; E05B 65/0811; E05B 2015/0472; E05B 83/32; Y10T 292/0894; Y10T 292/0911; Y10T 292/0926; Y10T 292/0934
See application file for complete search history.

(56) References Cited

U.S. PATENT DOCUMENTS

| | | | | |
|---|---|---|---|---|
| 3,455,590 | A | * | 7/1969 | Zerfoss ................. E05C 3/14 |
| | | | | 292/228 |
| 4,893,850 | A | | 1/1990 | Mizusawa |
| 5,234,124 | A | * | 8/1993 | Buckner, III .......... A61B 1/121 |
| | | | | 220/326 |
| 5,583,612 | A | * | 12/1996 | Schell ................. G03G 21/16 |
| | | | | 399/107 |
| 7,201,411 | B2 | * | 4/2007 | Bella ................. E05B 65/5223 |
| | | | | 292/336.3 |
| 7,644,963 | B2 | * | 1/2010 | Fan ................. E05C 19/10 |
| | | | | 292/121 |
| 8,783,739 | B2 | * | 7/2014 | Hasegawa ............... E05B 83/32 |
| | | | | 292/220 |
| 10,871,014 | B2 | * | 12/2020 | Cho ................. B60R 7/06 |
| 2020/0291696 | A1 | * | 9/2020 | Seki ................. E05B 77/36 |

FOREIGN PATENT DOCUMENTS

| | | |
|---|---|---|
| JP | S62-141865 U | 9/1987 |
| JP | S63-005958 Y2 | 2/1988 |
| JP | H06-008775 A | 1/1994 |
| JP | H06-011345 Y2 | 3/1994 |

OTHER PUBLICATIONS

Jan. 19, 2021, International Search Report issued for related PCT application No. PCT/JP2020/040796.
Jan. 19, 2021, International Search Opinion issued for related PCT application No. PCT/JP2020/040796.

* cited by examiner

LOCK LEVER AND OPENING/CLOSING DEVICE

CROSS REFERENCE TO PRIOR APPLICATION

This application is a National Stage Patent Application of PCT International Patent Application No. PCT/JP2020/040796 (filed on Oct. 30, 2020) under 35 U.S.C. § 371, which claims priority to Japanese Patent Application No. 2019-199714 (filed on Nov. 1, 2019), which are all hereby incorporated by reference in their entirety.

TECHNICAL FIELD

The present invention relates to a technique of a lock lever that brings a lid body into a locked state.

BACKGROUND ART

For example, a lock lever that holds a lid body in a closed state is attached to the lid body that opens and closes an opening of a fixed body such as a console box. A user unlocks and opens the console box by operating the lock lever.

Patent Literature 1 discloses a locking device for a lid of a console box including a locking body provided on a lid body. The locking body includes a rotating shaft portion pivotally installed by the lid body, an elastic piece protruding from the rotating shaft portion as a base end, an operation portion protruding from the lid body to an outside, and a locking piece that is engaged with and detached from a body of the console box.

CITATION LIST

Patent Literature

Patent Literature 1: JP-UM-A-S62-141865

SUMMARY OF INVENTION

Technical Problem

By disposing the rotating shaft portion of the locking body disclosed in Patent Literature 1 on an end portion side of the lid body, it is possible to increase a degree of freedom in design of the lid body, but the closer the rotating shaft portion is to the end portion side of the lid body, the shorter the elastic piece becomes, and operability deteriorates.

An object of the present invention is to provide a technique of a lock lever that suppresses a decrease in operability while increasing a degree of freedom in design of a lid body.

Solution to Problem

In order to solve the above problems, according to an aspect of the present invention, there is provided a lock lever that is to be provided on a lid body configured to close an opening of a fixed body and that is configured to lock the lid body to the fixed body in a closed state. The lock lever includes: a base portion having an operation portion; a rotation shaft portion that is pivotally supported by the lid body and that allows the base portion to rotate; a lock portion that is configured to rotate together with the base portion and that is configured to be locked to or unlocked from the fixed body in accordance with rotation; and an elastic piece that extends from the base portion and has a tip end side configured to elastically contact the lid body to bias the lock portion in a rotation direction to lock the lock portion. The elastic piece extends from the base portion so as to approach the rotation shaft portion, and extends so as to be separated from the rotation shaft portion toward a tip end on the way when viewed in a rotation axis direction.

According to other aspect of the present invention, there is provided an opening and closing device. The opening and closing device includes: a lid body configured to open and close an opening of a fixed body; and a lock lever provided on the lid body. The lock lever includes: a base portion having an operation portion; a rotation shaft portion that is pivotally supported by the lid body and that allows the base portion to rotate; a lock portion that is configured to rotate together with the base portion and that is configured to be locked to or unlocked from the fixed body in accordance with rotation; and an elastic piece that extends from the base portion and has a tip end side configured to elastically contact the lid body to bias the lock portion in a direction to lock the lock portion. The elastic piece extends from the base portion so as to approach the rotation shaft portion, and extends so as to be separated from the rotation shaft portion toward a tip end on the way when viewed in a rotation axis direction.

Advantageous Effects of Invention

According to the present invention, it is possible to provide a technique of the lock lever that suppresses a decrease in operability while increasing a degree of freedom in design of the lid body.

DESCRIPTION OF EMBODIMENTS

Figure 1:
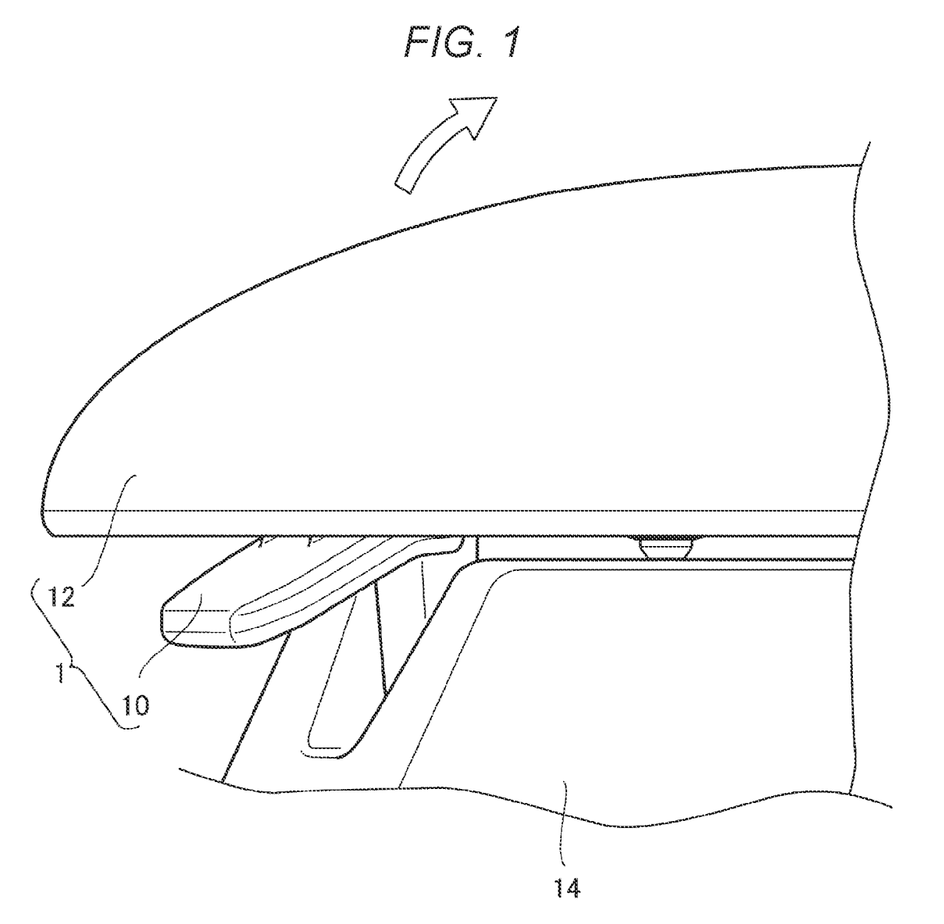
FIG. 1 is a partial perspective view of an opening and closing device according to an embodiment.

FIG. 1 is a partial perspective view of an opening and closing device 1 according to an embodiment. The opening and closing device 1 includes a lock lever 10 and a lid body 12. The opening and closing device 1 is provided in a storage device such as a console box of a vehicle, for example. A storage portion of the storage device is formed in a box shape as a fixed body 14, and rotatably supports the lid body 12.

The lid body 12 can open and close an opening of the fixed body 14 in accordance with rotation. The lid body 12 take on an open state where the opening of the fixed body 14 is opened and a closed state where the opening of the fixed body 14 is closed.

The lock lever 10 is rotatably provided on the lid body 12, and can be locked to the fixed body 14 in a state where the lid body 12 closes the opening of the fixed body 14. The lock lever 10 takes on a locked state where the lock lever 10 is locked to the fixed body 14, and an unlock state where the lock is released in accordance with the rotation.

Figure 2A:
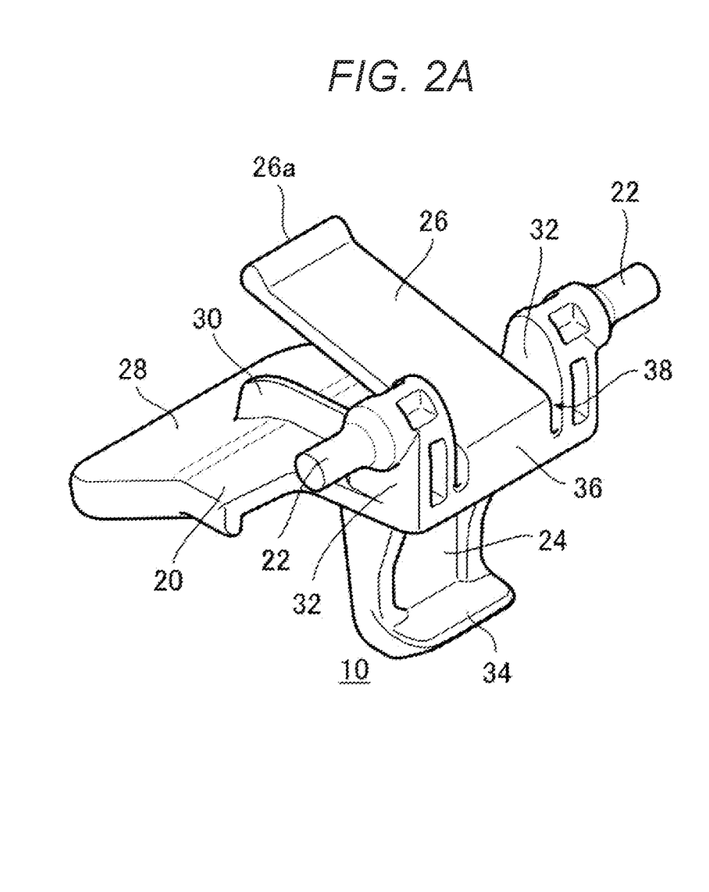
FIGS. 2A and 2B are perspective views of a lock lever.
Figure 2B:
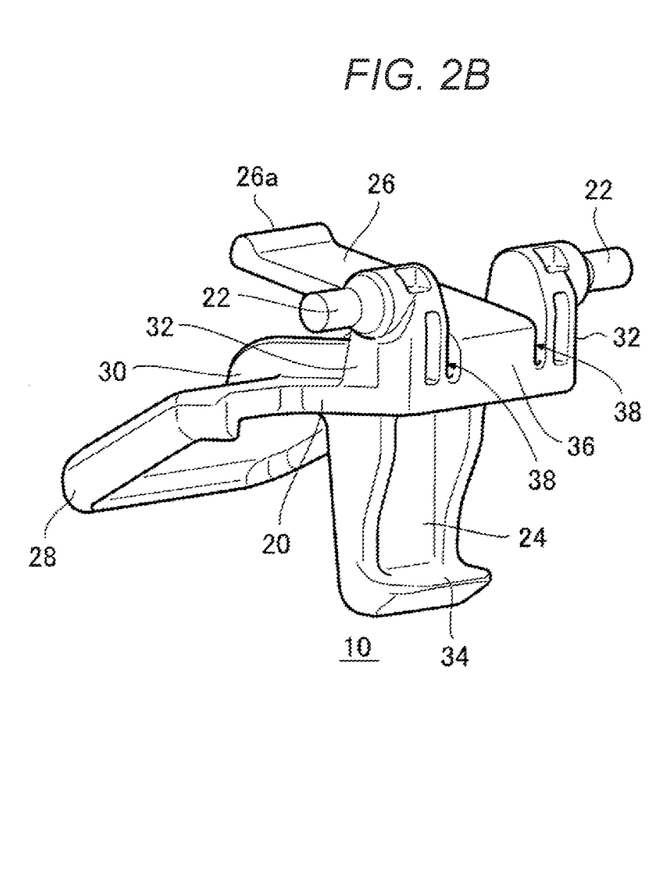
Figure 3A:
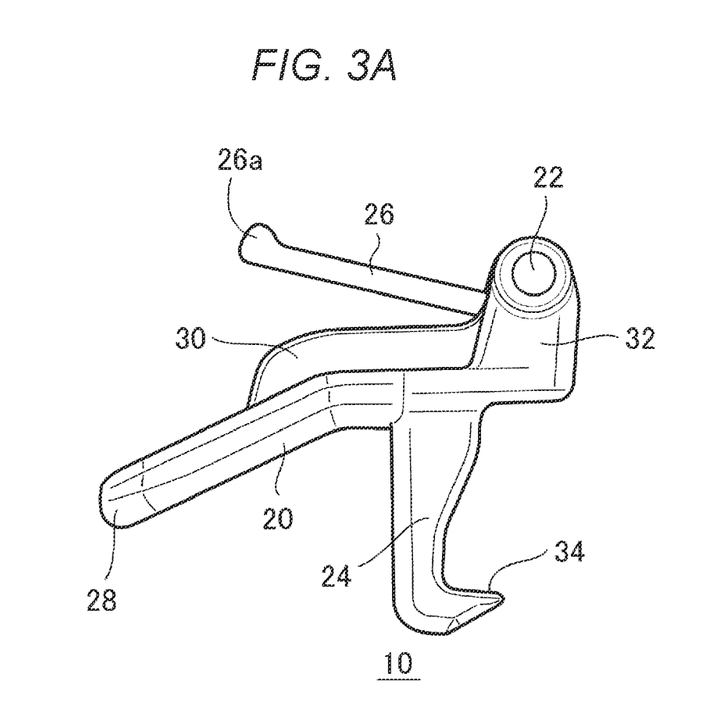
FIG. 3A is a side view of the lock lever.
Figure 3B:
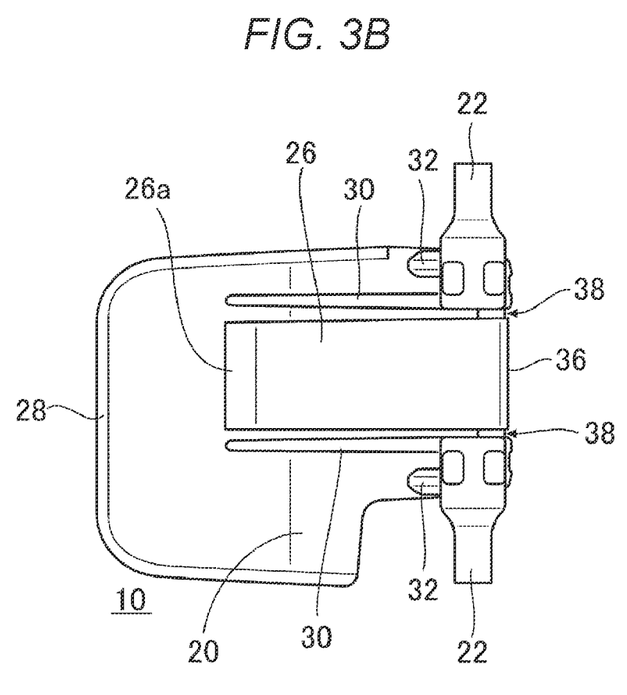
FIG. 3B is a top view of the lock lever.

FIGS. 2A and 2B are perspective views of the lock lever 10. FIG. 2A is a view of the lock lever 10 as viewed obliquely from above, and FIG. 2B is a view of the lock lever 10 as viewed obliquely from below. FIG. 3A is a side view of the lock lever 10, and FIG. 3B is a top view of the lock lever 10.

The lock lever 10 includes a base portion 20, rotation shaft portions 22, a lock portion 24, an elastic piece 26, ribs 30, and wall portions 32. The base portion 20 is formed in a plate shape and rotates about the rotation shaft portion 22. The base portion 20 has an operation portion 28 on a tip end side, and the rotation shaft portions 22 are provided on a base end side of the base portion 20.

The pair of wall portions 32 are erected on an upper surface of the base portion 20 on the base end side and face each other. The wall portion 32 supports the rotation shaft portion 22. The pair of rotation shaft portions 22 are positioned on the base end side of the base portion 20, are formed coaxially, and protrude outward from the pair of wall portions 32 in a facing direction.

The lock portion 24 extends from a lower surface of the base portion 20, rotates together with the base portion 20, and is locked to or unlocked from the fixed body 14 in accordance with the rotation. The lock portion 24 has a locking claw 34 formed at a tip end of the lock portion 24, and the locking claw 34 can be locked to the fixed body 14.

The elastic piece 26 is a cantilever that can be bent, extends from the upper surface of the base portion 20, and is formed so as to rise obliquely upward from the base end side toward the tip end side of the base portion 20. A tip end portion 26a of the elastic piece 26 elastically contacts the lid body 12 and biases the lock portion 24 in a direction to lock the lock portion 24. Accordingly, when the lock portion 24 is unlocked by a user operation, the lock portion 24 can return to the locked state. The elastic piece 26 is disposed so as to face the base portion 20. With the elastic piece 26, a separate spring or the like that returns the lock lever 10 to an original position can be eliminated, and cost of the opening and closing device 1 can be reduced.

As shown in FIG. 3B, the elastic piece 26 is provided so as to pass between the pair of wall portions 32, and a slit 38 is provided between a side surface of the elastic piece 26 and a facing surface of the wall portion 32. Accordingly, the elastic piece 26 can be elongated only in a portion passing between the wall portions 32, and the elastic piece 26 can be easily bent.

The elastic piece 26 has a contact surface 36 on a base end portion, the contact surface 36 contacting an opening edge of the lid body 12. A portion of the contact surface 36 includes a base end portion of the base portion 20. The elastic piece 26 rises upward from the base end portion of the base portion 20 and is bent toward the tip end side of the base portion 20. The contact surface 36 is formed at a portion rising from the base portion 20. When the contact surface 36 contacts the lid body 12, rotation in the direction to lock the lock portion 24 is stopped against biasing of the elastic piece 26.

The pair of ribs 30 are erected on the upper surface of the base portion 20 and extend from the wall portion 32 toward the tip end side of the base portion 20. Rigidity of the base portion 20 can be secured by the ribs 30. In addition, the rib 30 may also function as a guide for the elastic piece 26.

Figure 4:
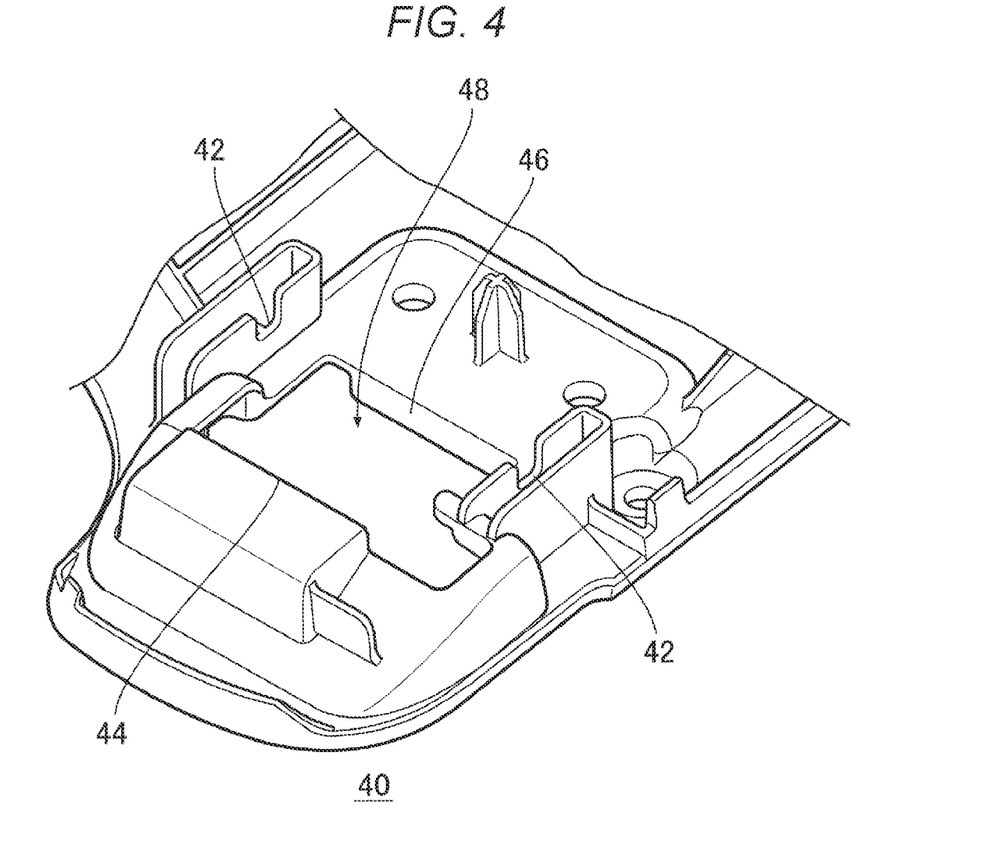
FIG. 4 is a partial perspective view of a lower member of a lid body to which the lock lever is attached.

FIG. 4 is a partial perspective view of a lower member 40 of the lid body 12 to which the lock lever 10 is attached. The lid body 12 is provided by stacking a plurality of members, and includes at least the lower member 40 positioned on a lower side (rear side) and an upper member positioned on an upper side (front side) in the lid body 12 in the closed state. The lock lever 10 is attached to the lower member 40 of the lid body 12.

The lower member 40 includes shaft support portions 42, a first receiving surface 44, a second receiving surface 46, a third receiving surface 45, and an opening 48. The opening 48 is provided so as to penetrate the lower member 40, and the lock lever 10 is inserted through the opening 48. The opening 48 allows an outside of the lid body 12 to communicate with an internal space of the lid body 12. The pair of shaft support portions 42 are formed on an inner surface of the lower member 40, and are provided on both sides of the opening 48. The shaft support portion 42 is formed in a concave shape and pivotally supports the rotation shaft portion 22 of the lock lever 10. Movement of the rotation shaft portion 22 off the shaft support portion 42 is restricted by the upper member of the lid body 12.

The first receiving surface 44 and the third receiving surface 45 are positioned on an outer surface of the rib 30. The first receiving surface 44 receives the tip end portion 26a of the elastic piece 26, and the third receiving surface 45 receives the operation portion 28. The first receiving surface 44 is formed in a raised portion of the lower member 40. The second receiving surface 46 is formed at an edge of the opening 48 and receives the contact surface 36 of the lock lever 10. The second receiving surface 46 is formed by protruding the edge of the opening 48 downward.

Figure 5A:
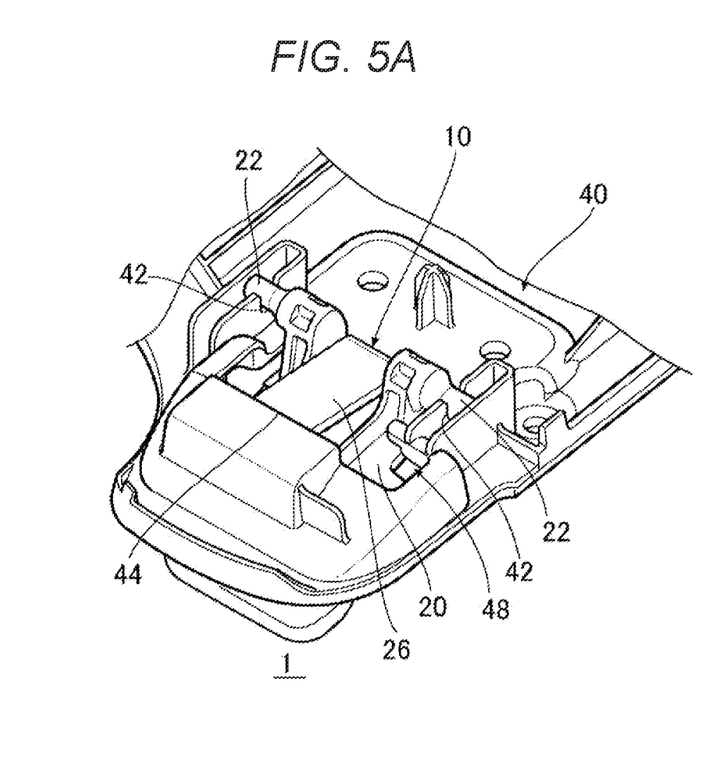
FIGS. 5A and 5B are perspective views of the opening and closing device in which the lock lever is attached to the lower member.
Figure 5B:
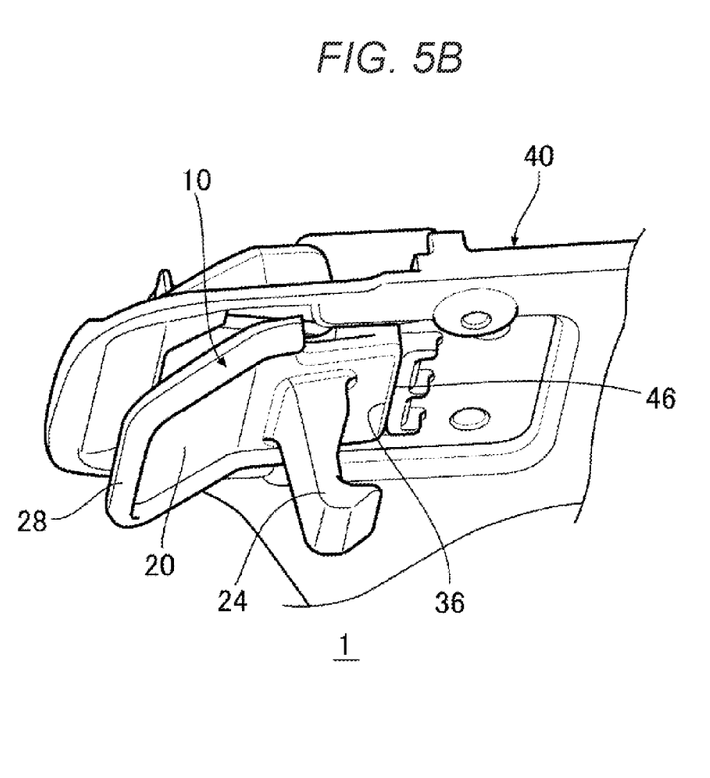

FIGS. 5A and 5B are perspective views of the opening and closing device 1 in which the lock lever 10 is attached to the lower member 40. FIG. 5A is a view of an inner surface side of the lower member 40, and FIG. 5B is a view of an outer surface side of the lower member 40. The inner surface of the lower member 40 is closed by the upper member of the lid body 12.

FIG. 5A shows a state where the rotation shaft portion 22 is pivotally supported by the shaft support portion 42 on the inner surface side of the lower member 40. That is, in an attached state, the rotation shaft portion 22 is positioned on the inner surface side of the lower member 40. On the other hand, the base portion 20, the lock portion 24, and the elastic piece 26 are positioned on the outer surface side of the lower member 40.

Figure 6:
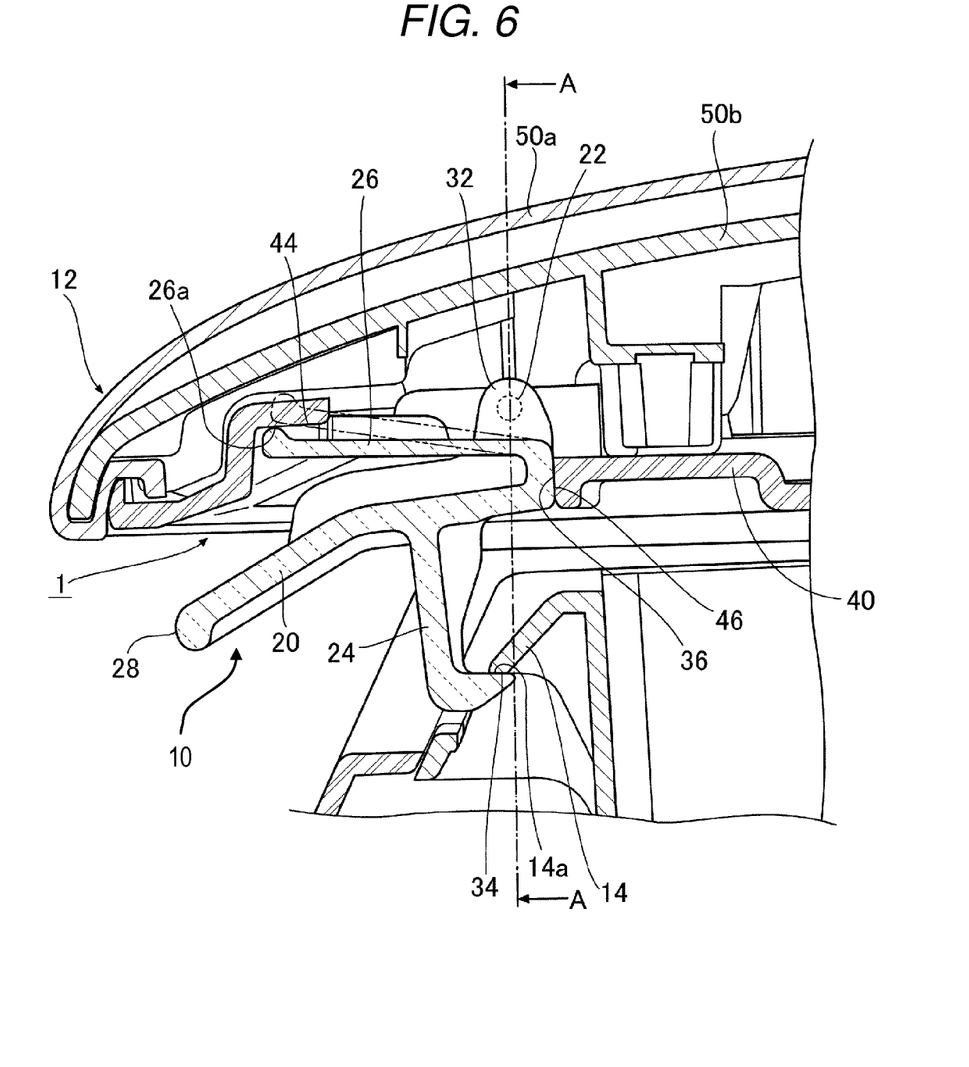
FIG. 6 is a cross-sectional view of the opening and closing device attached to a fixed body.

FIG. 6 is a cross-sectional view of the opening and closing device 1 attached to the fixed body 14, and is a view of the opening and closing device 1 viewed in a rotation axis direction. The lid body 12 includes the lower member 40 that supports the lock lever 10, and a first upper member 50a and a second upper member 50b that cover the inner surface of the lower member 40. In a state where the lid body 12 shown in FIG. 6 is closed, the first upper member 50a is exposed, and the lower member 40 is substantially covered.

The lock lever 10 shown in FIG. 6 is in the locked state, and the lock portion 24 is locked with a lock hole 14a of the fixed body 14. In the locked state, the elastic piece 26 elastically contacts the first receiving surface 44 of the lower member 40 and biases the lock portion 24 in a rotation direction to lock the lock portion 24. Accordingly, the lock portion 24 is less likely to be unlocked. In FIG. 6, the elastic piece 26 in a free state, that is, in a state where no external force is applied, is indicated by a two-dot chain line.

The elastic piece 26 extends from the base portion 20 so as to approach the rotation shaft portion 22, and extends so as to be separated from the rotation shaft portion 22 toward the tip end on the way when viewed in the rotation axis direction. That is, the rotation shaft portion 22 is at a position facing an upper surface of the elastic piece 26. Since the lock lever 10 is disposed on an end side of the lid body 12, it is difficult to extend the elastic piece 26 to the end side of the lid body 12, but the elastic piece 26 can be formed long regardless of a position of the rotation shaft portion 22. In addition, since the rotation shaft portion 22 can be provided away from the elastic piece 26, the rotation shaft portion 22 can be disposed on the end side of the lid body 12. By bringing the lock lever 10 close to an end of the lid body 12, the lid body 12 can be downsized, and a storage volume of the fixed body 14 can be increased.

The elastic piece 26 is provided so as to pass between the base portion 20 and the rotation shaft portions 22 when viewed in the rotation axis direction. Accordingly, the elastic piece 26 can be disposed close to the base portion 20, and the lock lever 10 can be downsized in a direction perpendicular to a surface of the base portion 20 (vertical direction). Therefore, it is also possible to design the lid body 12 to be thin.

In the locked state, the contact surface 36 contacts the second receiving surface 46. Accordingly, the base end side of the elastic piece 26 can be used for rotation stop in a locking direction. In addition, by using the edge of the opening 48 of the lower member 40, that is, the second receiving surface 46 for rotation stop, it is possible to suppress the lower member 40 from becoming thicker in the vertical direction than in a case where a separate rotation stop portion is provided in the lower member 40.

Figure 7:
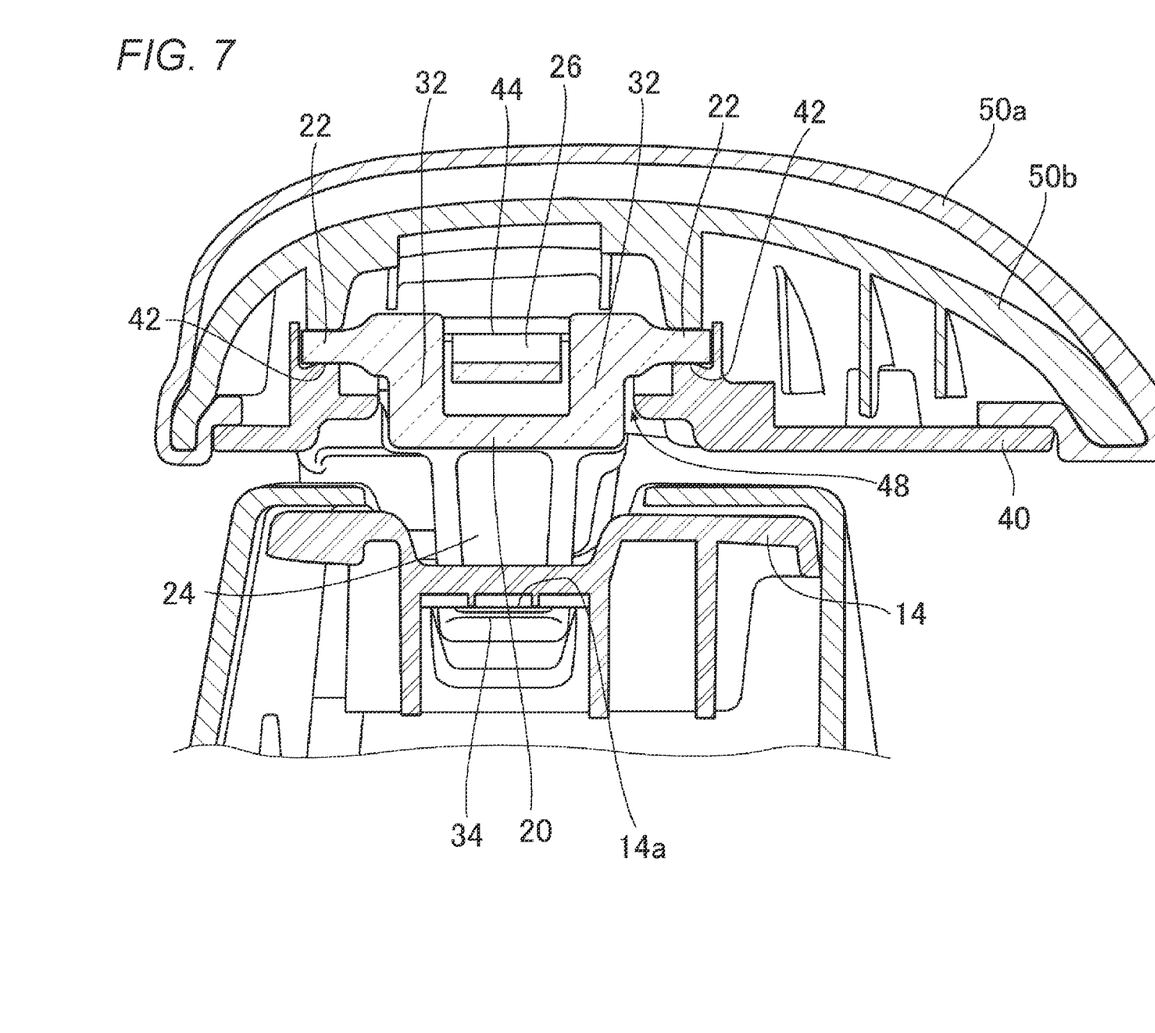
FIG. 7 is a cross-sectional view taken along a line A-A of the opening and closing device shown in FIG. 6.

FIG. 7 is a cross-sectional view taken along a line A-A of the opening and closing device 1 shown in FIG. 6. As shown in FIG. 7, the first upper member 50a, the second upper member 50b, and the lower member 40 form the internal space of the lid body 12. The rotation shaft portion 22 and the wall portion 32 of the lock lever 10 enter the internal space of the lid body 12 from the opening 48. The elastic piece 26 passes between the pair of wall portions 32 and contacts the first receiving surface 44, and does not enter the internal space of the lid body 12.

Figure 8:
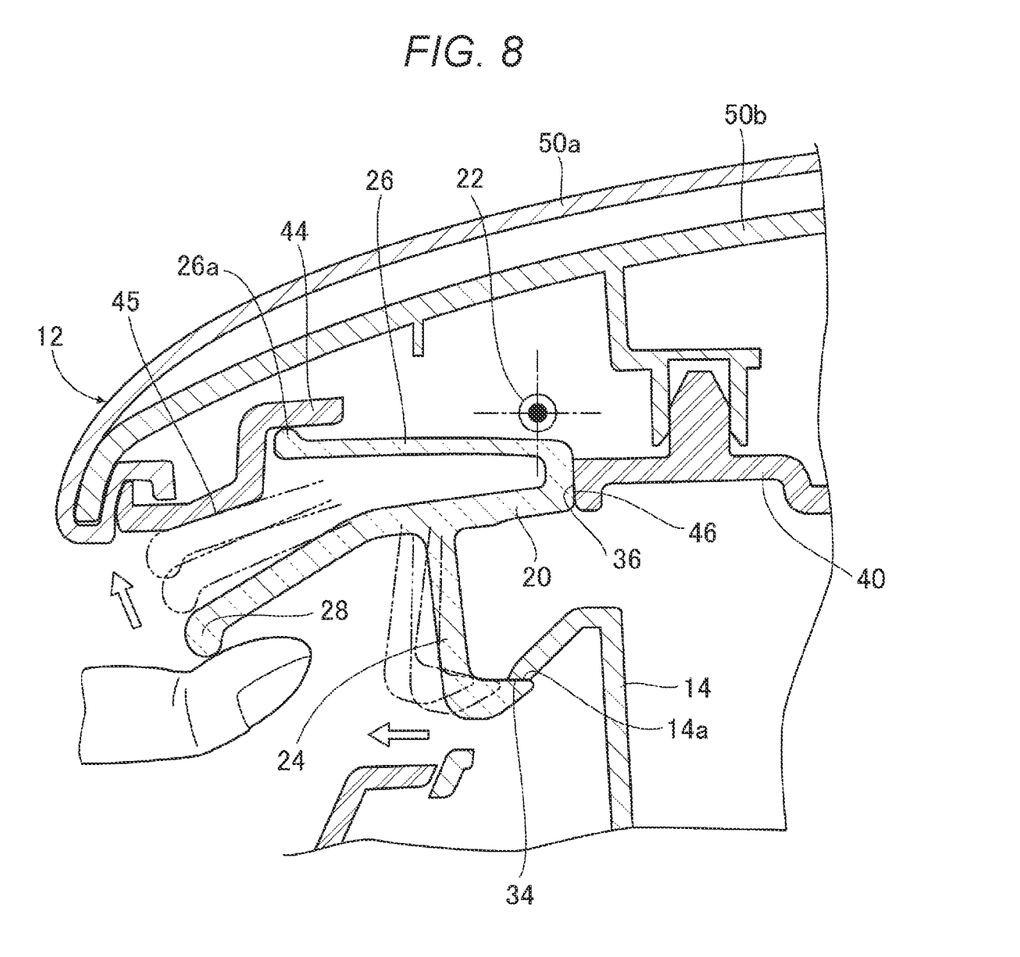
FIG. 8 is a view showing an operation of the lock lever.

FIG. 8 is a view showing an operation of the lock lever 10. In FIG. 8, a state where the lock lever 10 in the locked state is brought into the unlocked state is shown, solid lines indicate the lock portion 24 and the operation portion 28 in the locked state, and broken lines indicate the lock portion 24 and the operation portion 28 in the unlocked state.

The lid body 12 in the closed state is locked by the lock lever 10, and it is necessary to unlock the lid body 12 in order to open the lid body 12. A user moves a finger to a lower side of the operation portion 28 to lift the operation portion 28 upward. The operation portion 28 of the base portion 20 is rotatable by the rotation shaft portion 22, and the base portion 20 is rotated by a user operation, and the lock portion 24 also rotates with the base portion 20 in an unlocking direction. Then, when the locking claw 34 comes out of the lock hole 14a, the unlocked state is obtained.

In a state where the user lifts the operation portion 28 and the operation portion 28 contacts a third receiving surface 45 of the lower member 40, locking of the locking claw 34 is reliably released, and the rotation in the unlocking direction is restricted. Accordingly, excessive bending of the elastic piece 26 is suppressed. In the unlocked state, a lower portion of the contact surface 36 is separated from the second receiving surface 46.

When the user removes the finger from the operation portion 28, the base portion 20 and the lock portion 24 are rotated in a locking direction by a biasing force of the elastic piece 26, the locking claw 34 enters the lock hole 14a, and the contact surface 36 is pressed against the second receiving surface 46 to stop the rotation in the locking direction. By using the contact surface 36 for rotation stop, a posture of the locking claw 34 can be stabilized, and even when the lid body 12 is to be opened in the locked state, the locking claw 34 can be firmly hooked to the lock hole 14a.

The rotation shaft portion 22 is positioned inside (on an upper side of) the lower member 40, and the base portion 20, the lock portion 24, and the elastic piece 26 are positioned outside (on a lower side of) the lower member 40. Since the base portion 20, the lock portion 24, and the elastic piece 26 of the lock lever 10 are disposed outside the lid body 12, a structure inside the lid body 12 can be simplified, and the lid body 12 can be designed to be thin.

The tip end portion 26a of the elastic piece 26 contacts the first receiving surface 44, the contact surface 36 contacts the second receiving surface 46 in the locked state, and the operation portion 28 of the base portion 20 contacts the third receiving surface 45 by an unlocking operation. That is, the tip end portion 26a of the elastic piece 26, the contact surface 36, and the operation portion 28 can contact the lower member 40 of the lid body 12 from the outside of the lid body 12. By bringing the tip end portion 26a of the elastic piece 26, the contact surface 36, and the operation portion 28 into contact with the lower member 40 thus, an influence of a manufacturing error can be reduced. For example, when parts of the lock lever 10 contact a plurality of members, design management becomes difficult due to an influence of an assembly error of the plurality of members, but the design management becomes easy by bringing the parts of the lock lever 10 into contact with one member.

The present invention is not limited to the embodiment described above and modifications such as various design changes can be added to the embodiment based on knowledge of a person skilled in the art. Embodiments to which such modifications are added can also be included in the scope of the present invention.

INDUSTRIAL APPLICABILITY

The present invention relates to a technique of a lock lever that brings a lid body into a locked state.

REFERENCE SIGNS LIST 1 opening and closing device
10 lock lever
12 lid body
14 fixed body
14a lock hole
20 base portion
22 rotation shaft portion
24 lock portion
26 elastic piece
26a tip end portion
28 operation portion
30 rib
32 wall portion
34 locking claw
36 contact surface
38 slit
40 lower member
42 shaft support portion
44 first receiving surface
45 third receiving surface 46 second receiving surface
48 opening
50a first upper member
50b second upper member

The invention claimed is:

1. A lock lever that is to be provided on a lid body configured to close an opening of a fixed body and that is configured to lock the lid body to the fixed body in a closed state, the lock lever comprising:
 a base portion having an operation portion;
 a rotation shaft portion that is pivotally supported by the lid body and that allows the base portion to rotate;
 a lock portion that is configured to rotate together with the base portion and that is configured to be locked to or unlocked from the fixed body in accordance with rotation; and
 an elastic piece that extends from the base portion and that has a tip end configured to elastically contact the lid body to bias the lock portion in a direction to lock the lock portion, wherein
 the elastic piece extends from the base portion so as to approach the rotation shaft portion, and extends so as to be separated from the rotation shaft portion toward the tip end of the elastic piece on the way when viewed in a rotation axis direction, and
 the rotation shaft portion is supported on a wall portion erected from the base portion, positioning the rotation shaft portion on an upper side of the base portion with respect to the tip end of the elastic piece.

2. The lock lever according to claim 1, wherein the elastic piece is provided so as to pass between the base portion and the rotation shaft portion when viewed in the rotation axis direction.

3. The lock lever according to claim 1, wherein the elastic piece has a contact surface that is configured to contact the lid body at a base end portion to stop rotation in the direction to lock the lock portion.

4. The lock lever according to claim 1, wherein
 the lid body has an opening that communicates with an internal space of the lid body,
 the rotation shaft portion is positioned inside the lid body, and the base portion, the lock portion, and the elastic piece are positioned outside the lid body, and
 the tip end of the elastic piece and the operation portion are configured to contact the lid body from the outside of the lid body.

5. A lock lever that is to be provided on a lid body configured to close an opening of a fixed body and that is configured to lock the lid body to the fixed body in a closed state, the lock lever comprising:
 a base portion having an operation portion;
 a rotation shaft portion that is pivotally supported by the lid body and that allows the base portion to rotate;
 a lock portion that is configured to rotate together with the base portion and that is configured to be locked to or unlocked from the fixed body in accordance with rotation;
 an elastic piece that extends from the base portion and that has a tip end configured to elastically contact the lid body to bias the lock portion in a direction to lock the lock portion; and
 a pair of wall portions that are erected from the base portion and that support the rotation shaft portion, wherein
 the elastic piece extends from the base portion so as to approach the rotation shaft portion, and extends so as to be separated from the rotation shaft portion toward the tip end of the elastic piece on the way when viewed in a rotation axis direction, and
 the elastic piece is provided so as to pass between the pair of wall portions.

6. An opening and closing device comprising:
 a lid body configured to open and close an opening of a fixed body; and
 a lock lever provided on the lid body, wherein
 the lock lever includes:
 a base portion having an operation portion;
 a rotation shaft portion that is pivotally supported by the lid body and that allows the base portion to rotate;
 a lock portion that is configured to rotate together with the base portion and that is configured to be locked to or unlocked from the fixed body in accordance with rotation; and
 an elastic piece that extends from the base portion and has a tip end configured to elastically contact the lid body to bias the lock portion in a direction to lock the lock portion,
 the elastic piece extends from the base portion so as to approach the rotation shaft portion, and extends so as to be separated from the rotation shaft portion toward the tip end of the elastic piece on the way when viewed in a rotation axis direction, and
 the rotation shaft portion is supported on a wall portion erected from the base portion, positioning the rotation shaft portion on an upper side of the base portion with respect to the tip end of the elastic piece.

* * * * *